United States Patent [19]

Stephens

[11] Patent Number: 5,298,556
[45] Date of Patent: * Mar. 29, 1994

[54] MOLD RELEASE COMPOSITION AND METHOD COATING A MOLD CORE

[75] Inventor: William D. Stephens, Clearwater, Fla.

[73] Assignee: TSE Industries, Inc., Fla.

[*] Notice: The portion of the term of this patent subsequent to Jun. 15, 2010 has been disclaimed.

[21] Appl. No.: 43,038

[22] Filed: Apr. 5, 1993

Related U.S. Application Data

[62] Division of Ser. No. 917,772, Jul. 21, 1992, Pat. No. 5,219,925.

[51] Int. Cl.$^5$ ............................................. C08L 83/06
[52] U.S. Cl. ................................. 3524/860; 524/863; 524/188; 524/588; 427/133; 427/134; 427/135; 252/182.33
[58] Field of Search ............... 524/860, 863, 188, 588; 252/182.33; 427/133, 134, 135

[56] References Cited

U.S. PATENT DOCUMENTS 5,219,925  6/1993  Stevens .................. 524/860

FOREIGN PATENT DOCUMENTS 0103871  9/1983  European Pat. Off. .
62-111381  3/1989  Japan .

Primary Examiner—Maurice J. Welsh
Attorney, Agent, or Firm—Herbert W. Larson

[57] ABSTRACT

An aqueous reaction mixture having a pH of 4.5 to 5.5 of a multi-functional polydimethyl siloxane emulsified polymer, a methyl triethoxy silane, a mixture of substituted nonyl and octyl phenol derivative surfactants, non-ionic fluorinated alkyl ester surfactant and synthetic ethoxylated amine surfactants, a silanol terminated polydimethyl siloxane and ethanol. The reaction mixture is coated on a mold core surface and cured with heat to form a mold release surface that can be used in excess of twenty times prior to recoating.

12 Claims, No Drawings

MOLD RELEASE COMPOSITION AND METHOD COATING A MOLD CORE

PRIOR APPLICATION

This application is a divisional continuation-in-part from my application Ser. No. 07/917,772, filed Jul., 21, 1992, now U.S. Pat. No. 5,219,925.

BACKGROUND OF THE INVENTION

1. Field of the Invention

This invention relates to organopolysiloxane mold release compositions. More particularly, it refers to such mold release compositions also containing a methyl trimethoxy or triethoxy silane in an aqueous solution and methods for employing the composition in a mold.

2. Description of the Prior Art

In the process of preparing molded products such as urethanes, natural rubber, silicones, neoprene, and other synthetic elastomers, it is necessary to coat the core surfaces of molds to prevent the molded product from sticking to the mold. Coatings used to prevent such molded products from sticking to molds are called mold release agents. Some of the mold release agents previously used are solvent based, and some are water based. Polydimethylsiloxanes have been used as one of the ingredients in prior art mold release compositions, as well as methyl triethoxy silanes together with surfactants, and in many instances with a catalyst. U.S. Pat. Re. No. 32,318 describes an aqueous lubricating composition for time curing bladders containing polydimethylsiloxane, methyl hydrogen or methyl trimethoxy silane, a surfactant and a metal salt of an organic acid. Organic solvents were specifically excluded from the composition because they degraded the rubber surfaces and required frequency of recoat. U.S. Pat. No. 3,894,881 describes coating compositions applied to a plastic substrate for providing improved scratch resistance. These scratch resistant compositions contain a hydrolyzed silicon tetraalkoxide, a methyl trimethoxy silane, and a metal salt. U.S. Pat. No. 4,534,928 describes mold release compositions containing a polydimethylsiloxane, an alkoxysilane such as methyl trimethoxy silane, a metal alkoxide, and a non reactive volatile organic solvent which is substantially water-free.

Although these prior art mold release compositions have the ability to release molded products, they suffer from the need to recoat the molds frequently, have odor problems, or are toxic. A mold release composition is needed that is environmentally friendly and will permit greater than twenty releases of molded urethane, natural rubber, neoprene, and other synthetic elastomer for transfer, compression, and injection molding.

SUMMARY OF THE INVENTION

I have discovered a unique mold release composition which is non-toxic, environmentally friendly, and will allow greater than twenty releases of a molded urethane, silicone, natural rubber, neoprene, or other synthetic elastomer during compression or injection molding procedures.

My composition is an aqueous reaction mixture of a multifunctional polydimethyl siloxane emulsified polymer, a methyl triethoxy silane, substituted nonyl or octyl phenol derivative surfactants, fluoroalkyd non-ionic surfactant, and synthetic ethoxylated amines, silanol terminated siloxane, ethanol, acetic acid and water.

This reaction mixture can be coated on a mold core surface and cured with heat to form a semi-permanent mold release surface.

DETAILED DESCRIPTION OF THE INVENTION

Composition I of this invention is a reaction mixture of a multi-functional organo-silane crosslinker, and multi-functional polydimethyl siloxane emulsified polymer in a solution of water and ethanol. This reaction mixture produces a reactive silane in a mixture of emulsified poly organo siloxanes forming an interpenetrating network on a mold core surface upon application of heat.

Composition II contains the ingredients as a percent by weight in the following ranges:

| | |
|---|---|
| 0.5 to 12% | a silane selected from the group consisting of methyl triethoxy silane, methyl trimethoxy silane, vinyl triethoxy silane, vinyl trimethoxy silane, Gamma-ureidopropyltrialkoxy silane, where the alkoxy group has one to three carbon atoms, Gamma-glycidoxypropyltrimethoxy silane, octyltriethoxy silane, Gamma-aminopropyltriethoxy silane, Gamma-isocyanatopropyltriethoxy silane, tetraethoxysilane, Gamma-methacryloxypropyl trimethoxysilane, Beta- (3,4-epoxycyclohexyl) ethyltrimethoxy silane, Gamma-mercaptopropyltrimethoxy silane, and vinyl-tris (2-methoxyethoxy) silane, |
| 1 to 8% | a multi functional polydimethyl siloxane emulsified polymer, |
| 0.1 to 2.5% | substituted nonyl or octyl phenol derivative surfactant, |
| 0.05 to 4.0% | fluoroalkyd non-ionic surfactant, |
| 0.1 to 2.5% | synthetic ethoxylated amine surfactant, |
| 0.1 to 12.5% | silanol terminated polydimethyl siloxane having a molecular weight from 400 to 310,000, |
| 0.5 to 8% | lower alkyl alcohol, wherein the alkyl has 1–3 carbon atoms, |
| 70 to 97% | water, and |
| 0.5 to 1% | a weak acid to maintain the pH between 4.5 to 5.5. |

Three to five grams of the composition is applied to each square foot of a mold core surface and then heated to about 320 degrees F to form the interpenetrating network.

The two preferred compositions are prepared by mixing the following ingredients (% by weight) in water:

COMPOSITION I

3% methyl triethoxy silane,
1.8% deca methyl cyclopenta siloxane,
1.6% octo methyl cyclotetra siloxane,
0.6% dodeca methyl cyclo hexa siloxane,
1.5% surfactants which are a substituted nonyl and octyl phenol derivative and synthetic ethoxylated amines,
3.0% ethanol, and
88.5% water.

The methyl triethoxy silane reacts with the water to produce additional ethanol. The mixture is sprayed on a clean mold core surface and heated to 320 degrees F. to vaporize the water and coat the mold core.

The methyl triethoxy silane can be substituted with methyl trimethoxy silane, vinyl triethoxy silane or vinyl trimethoxy silane to achieve substantially the same results in the mixture and on spraying the resulting mixture on a mold core.

COMPOSITION II 3.4% methyl triethoxy silane,
1.8% deca methyl cyclopenta siloxane,
1.6% octo methyl cyclotetra siloxane,
0.6% dodeca methyl cyclo hexa siloxane,
1.5% non-ionic fluorinated alkyl esters surfactant,
0.5% substituted nonyl and octyl phenol surfactant,
0.3% synthetic ethoxylated amine surfactant,
2.6.% ethanol,
3.0% silanol terminated polydimethyl siloxane having a molecular weight between 400 and 310,000,
1% acetic acid, and
83.7 water.

The following examples exemplify methods of preparing the compositions of this invention and applying them to mold core surfaces.

EXAMPLE I 197 grams of distilled water was mixed with 23 grams of the mixture of siloxanes set forth above in the preferred composition I, together with substituted nonyl and octyl phenol derivative and synthetic ethoxylated amine surfactant mixtures and 9.4 grams of methyl triethoxy silane. 120 grams of ethanol was mixed with 2725 grams of tap water, 30 grams of methyl triethoxy silane and 300 grams of the aforementioned siloxane and surfactant mixture. The two mixtures were then blended and sprayed on a four inch mold. Both sides of the mold were preheated to 320 degrees F. and cured for five minutes.

A polyether millable urethane compound was applied and cured in the mold and released twenty times with no noticeable sticking on the mold.

Additional mold release compositions were prepared in the manner of EXAMPLE I with the ingredients indicated by weight percent in the following EXAMPLES II-V.

EXAMPLE II

1% methyl triethoxy silane,
0.9% deca methyl cyclopenta siloxane,
0.8% octo methyl cyclotetra siloxane,
0.6% dodeca methyl cyclo hexa siloxane,
0.75% surfactants,
1.0% ethanol and
96.0% water.

EXAMPLE III

6% methyl triethoxy silane,
1.8% deca methyl cyclopenta siloxane,
1.6% octo methyl cyclotetra siloxane,
0.6% dodeca methyl cyclo hexa siloxane,
1.5% surfactants,
3.0% ethanol and
85.5% water.

EXAMPLE IV

8% methyl triethoxy silane,
3.6% deca methyl cyclopenta siloxane,
3.2% octo methyl cyclotetra siloxane,
1.2% dodeca methyl cyclo hexa siloxane,
3.0% surfactants,
6.0% ethanol and
75% water.

EXAMPLE V

12% methyl triethoxy silane,
3.6% deca methyl cyclopenta siloxane,
3.2% octo methyl cyclotetra siloxane,
1.2% dodeca methyl cyclo hexa siloxane,
3.0% surfactants,
6.0% ethanol and
71% water.

EXAMPLE VI

A mold was used that had an undercut and a difficult configuration to mold. In a mold such as this, molding compounds will easily stick and tear. The mold was first degreased and then sandblasted. Thereafter, the mold release composition of EXAMPLE I above, was sprayed on the mold in a thin coating heated to molding temperature. Each of the following fluoroelastomer molding compositions was separately applied to the mold and released from the mold after curing thirty times without tearing.

| MOLDING COMPOUND A | |
|---|---|
| INGREDIENTS | PHR |
| Viton E-60-C Dupont Fluoroelastomer | 100.0 |
| VPA No 3 Proprietary Viton Process Aid | 1.0 |
| Mag-D Magnesium Oxide | 3.0 |
| Calcium Hydroxide | 6.0 |
| N-990 Carbon black filler MT type | 30.0 |

| MOLDING COMPOUND B | |
|---|---|
| INGREDIENTS | PHR |
| Viton A401C Dupont Fluoroelastomer | 100.0 |
| Maglite D Magnesium Oxide | 3.0 |
| Calcium Hydroxide | 6.0 |
| Carnauba Wax | 1.0 |
| N-990 Carbon black filler MT type | 20.0 |
| Powdered Teflon MP-1500 | 10.0 |

| MOLDING COMPOUND C | |
|---|---|
| INGREDIENTS | PHR |
| Viton A401C Dupont Fluoroelastomer | 100.0 |
| Maglite D Magnesium Oxide | 3.0 |
| Calcium Hydroxide | 6.0 |
| Carnauba Wax | 1.0 |
| N-990 Carbon black filler MT type | 35.0 |

EXAMPLE VII

A steel mold designed with a difficult undercut was employed. Any sticking at the undercut will result in a tear. The mold was first degreased and then sandblasted. The mold was heated to the molding temperature and the mold release composition of EXAMPLE I above was sprayed in the mold. Each of the following two silicone elastomer molding compositions were separately applied to the mold and released from the mold after curing. Thirty moldings were performed and no sticking or tearing occurred.

| MOLDING COMPOUND D | |
|---|---|
| INGREDIENTS | PHR |
| General Electric Silicone SE-4404U | 100.0 |
| Titanium Dioxide | 1.0 |
| 2,5-Dimethyl-2,5-Di (t-butyl-peroxy) hexane | 1.0 |

| MOLDING COMPOUND E | |
|---|---|
| INGREDIENTS | PHR |
| General Electric Silicone SE-88U | 100.0 |
| Titanium Dioxide | 1.0 |
| 2,5-Dimethyl-2,5-Di (t-butyl-peroxy) hexane | 1.0 |

EXAMPLE VIII

A steel mold designed with a difficult undercut was employed. Any sticking at the undercut will result in a tear. The mold was first degreased and then sandblasted. The mold was heated to the molding temperature and the mold release composition of EXAMPLE I above, was sprayed on the mold in a thin coat. Each of the following two urethane gum molding compositions was separately applied to the mold and released from the mold after curing. Thirty moldings were performed and no sticking or tearing occurred.

| MOLDING COMPOUND F | |
|---|---|
| INGREDIENTS | PHR |
| Polyether/TDI Millable Urethane Gum | 50.0 |
| Butadine Acrylonitrile Copolymer | 35.0 |
| Styrene Butadiene Copolymer | 15.0 |
| Stearic Acid | 1.0 |
| Zinc Stearate | 0.5 |
| N-550 FEF Carbon Black | 25.0 |
| N-770 SRF Carbon Black | 15.0 |
| Kaolin (hard) Clay (hydrated aluminum silicate) | 50.0 |
| Dioctyl Phthalate | 14.0 |
| Petroleum Hydrocarbon | 2.0 |
| Polymerized 1,2-Dihydro-2,2,4-Trimethylquinoline | 3.0 |
| Benzothiazyl Disulfide | 4.0 |
| 2-Mercaptobenzothiazole | 2.0 |
| Partial complex of Zinc Chloride & Benzothiazyl Disulfide | 1.0 |
| 99% Pure Sulfur Powder | 2.0 |

| MOLDING COMPOUND G | |
|---|---|
| INGREDIENTS | PHR |
| Polyether/TDI Millable Urethane Gum | 100.0 |
| Low Molecular Weight Polyethylene Powder | 2.0 |
| Zinc Stearate | 0.5 |
| Precipitated Hydrated Amorphous Silica | 35.0 |
| Coumarone-indene Resin | 10.0 |
| Teflon Powder MP-1500 | 1.0 |
| Naphthenic Oil | 1.0 |
| Blue Pigment in an EPDM binder 80% | 1.5 |
| Titanium Dioxide | 0.7 |
| Benzothiazyl Disulfide | 4.0 |
| 2-Mercaptobenzothiazole | 2.0 |
| Partial complex of Zinc Chloride & Benzothiazyl Disulfide | 1.5 |
| 99% Pure Sulfur Powder | 1.5 |

EXAMPLE IX 1720 grams of distilled water was mixed with 111 grams of the siloxanes, substituted vinyl and octyl phenol surfactant and synthetic ethoxylated amine surfactant in the proportion set forth in Composition II, above. To this aqueous mixture was added 34 of ethanol and 68 grams of methyl triethoxy silane. A second mixture was prepared containing 31 grams of a silanol terminated polydimethyl siloxane having a molecular weight of about 1000, 10 grams of a non-ionic fluorinated alkyl ester surfactant and 14 grams of 1 Normal acetic acid.

The two mixtures were blended and sprayed on a four inch mold at ambient temperature. Both sides of the mold were heated to the molding temperature of 320 degrees F. A polyether millable urethane compound is applied repeatedly and cured in the mold and released twenty times with no noticeable sticking on the mold.

EXAMPLE X

A steel mold designed with a difficult undercut was employed. Any sticking at the undercut will result in a tear. The mold was first degreased and then sandblasted. The mold was heated to the molding temperature and the mold release composition of EXAMPLE IX above, was sprayed on the mold in a thin coat. Each of the following five elastomer molding compositions was separately applied to the mold and released from the mold after curing. Thirty moldings were performed and no sticking or tearing occurred.

| MOLDING COMPOUND H | |
|---|---|
| | PHR |
| Ethylene/acrylic elastomer silica (DuPont) | 123.0 |
| 2,2-methylene-bis (4-methyl-6- butyl phenol) oxidation inhibitor (American Cyanamid) | 2.0 |
| Fatty acid process aid (Harwick) | 0.5 |
| Foamed silica (Degussa) | 5.0 |
| Calcium carbonate (E.C.E. AMERICA) | 100.0 |
| N, N-di-phenylene dimaleimide peroxide vulcanizing coagent (DuPont) | 2.0 |
| Dicumyl peroxide vulcanizing agent (Hercules) | 7.0 |

| MOLDING COMPOUND I | |
|---|---|
| | PHR |
| AFLAS ISOP | 100 |
| TAIC (75% dispersion) | 7.5 |
| Vul-Cuip 401SE | 2.5 |
| Sodium stearate | 2.0 |
| Medium Thermal Black | 28 |

| MOLDING COMPOUND J | |
|---|---|
| | PHR |
| Fluoroelastomer (3M) | 100.0 |
| Medium thermal carbon black (Phillips Petroleum) | 30.0 |
| Magnesium oxide acid acceptor (Calgon) | 3.0 |
| Calcium hydroxide cure activator (Henley) | 6.0 |

| MOLDING COMPOUND K | |
|---|---|
| | PHR |
| Morton International ST polysulfide rubber | 100 |
| Carbon black | 60 |
| Stearic acid | 1.0 |
| Zinc peroxide | 5.0 |
| Calcium hydroxide | 1.0 |

| MOLDING COMPOUND L | |
|---|---|
| | PHR |
| Ethylene propylene diene terpolymer (Royalene 512 by Uniroyal) | 100.0 |
| Zinc diacrylate (Sartomer SR-633) | 4.0 |
| Silicon dioxide (Summit Chemical) | 100.0 |
| Calcined and surface modified Kaolin clay (Engelhard) | 100.0 |
| Paraffinic oil (R. E. Carroll) | 40.0 |
| Silane Coupling Agent vinyl-tris (2-methoxyethoxy silane | 1.0 |

-continued

MOLDING COMPOUND L

| | PHR |
|---|---|
| (Union Carbide) Dicumyl peroxide vulcanizing agent | 8.0 |

Having thus described the invention what I claim and desire to be secured by Letters Patent is:

1. An aqueous mold release composition for use in coating compression transfer and injection molding core surfaces in contact with urethanes, silicones, natural rubber, neoprene and other synthetic elastomer, the composition comprising by weight:

| | |
|---|---|
| 0.5 to 12% | a silane selected from the group consisting of methyl triethoxy silane, methyl trimethoxy silane, vinyl triethoxy silane, vinyl trimethoxy silane, Gamma-ureidopropyltrialkoxy silane, where the alkoxy group has one to three carbon atoms, Gamma-glycidoxypropyltrimethoxy silane, octyltriethoxy silane, Gamma-amino propyltriethoxy silane, Gamma-isocyanatopropyltriethoxy silane, tetraethoxysilane, Gamma-methacryloxypropyl trimethoxysilane, Beta- (3, 4-epoxycyclohexyl) ethyltrimethoxy silane, Gamma-mercaptopropyl-trimethoxy silane, and vinyl-tris (2-methoxyethoxy) silane, |
| 1 to 8% | a multi functional polydimethyl siloxane emulsified polymer, |
| 0.1 to 2.5% | a substituted nonyl and octyl phenol derivative surfactant, |
| 0.05 to 4.0% | non-ionic fluorinated alkyl ester surfactant, |
| 0.1 to 2.5% | a synthetic ethoxylated amine surfactant, |
| 0.1 to 12.5% | a silanol terminated polydimethyl siloxane having a molecular weight of 400 to 310,000, |
| 0.5 to 8% | a lower alkyl alcohol, wherein the alkyl has 1-3 carbon atoms, |
| 0.5 to 1% | a weak acid to maintain the pH between 4.5-5.5, and |
| 70 to 97% | water. |

2. The aqueous mold release composition according to claim 1 wherein the composition comprises a mixture of less than ten percent by weight of the alkoxy silane, multifunctional polydimethyl siloxane, emulsified polymer and the surfactant mixture together with about three percent by weight of ethanol, less than 1% by weight acetic acid and the remainder water.

3. The aqueous mold release composition according to claim 1 wherein the silane is methyl triethoxy silane.

4. The aqueous mold release composition according to claim 1 wherein the multifunctional polydimethyl siloxane emulsified polymer is a mixture of deca methyl cyclopenta siloxane, octo methyl cyclotetra siloxane, and dodeca methyl cyclohexa siloxane.

5. An aqueous mold release composition for use in coating compression and injection molding core surfaces comprising a mixture of less than ten percent by weight of
   a silane selected from the group consisting of methyl triethoxy silane, methyl trimethoxy silane, vinyl triethoxy silane and vinyl trimethoxy silane,
   a multifunctional polydimethyl siloxane emulsified polymer,
   a substituted nonyl and octyl phenol derivative surfactant,
   a synthetic ethoxylated amine surfactant and a nonionic fluorinated alkyl ester surfactant,
   a silanol terminated polydimethylsiloxane having a molecular weight from 400 to 310,000,
   and acetic acid in an amount sufficient to maintain the pH at 4.5 to 5.5, ethanol and the remainder water.

6. The aqueous mold release composition according to claim 5 wherein the silane is methyl triethoxy silane.

7. The aqueous mold release composition according to claim 5 wherein the siloxane is a mixture of deca methyl cyclopenta siloxane, octo methyl cyclotetra siloxane and dodeca methyl cyclo hexa siloxane.

8. The aqueous mold release composition according to claim 5 wherein the molecular weight of the silanol terminated polydimethylsiloxane is about 1000.

9. The aqueous mold release composition according to claim 5 wherein the ethanol is present at 0.5 to 8% by weight.

10. The aqueous mold release composition according to claim 5 wherein the composition comprises by weight about:
    3.4% methyl triethoxy silane,
    1.8% deca methyl cyclopenta siloxane,
    1.6% octo methyl cyclotetra siloxane,
    0.6% dodeca methyl cyclo hexa siloxane,
    1.5% non-ionic fluorinated alkyl ester surfactant,
    0.3% synthetic ethoxylated amine surfactant,
    0.5% substituted nonyl and octyl phenol derivative surfactant,
    3.0% silanol terminated polydimethyl siloxane having a molecular weight between 400 and 310,000,
    2.6% ethanol
    1.0% acetic acid, and
    83.7% distilled water.

11. A method of forming a semi-permanent mold release surface on a mold core comprising cleaning the core surfaces, heating both sides of the core surfaces to about 320 degrees F. and spraying the mold core with an aqueous composition containing less than ten percent by weight of a mixture of a silane selected from the group consisting of methyl triethoxy silane, methyl trimethoxy silane, vinyl triethoxy silane, vinyl trimethoxy silane, Gamma-ureidopropyltrialkoxy silane, where the alkoxy group has one to three carbon atoms, Gamma-glycidoxypropyltrimethoxy silane, octyltriethoxy silane, Gamma-amino propyltriethoxy silane, Gamma-isocyanatopropyltriethoxy silane, tetraethoxysilane, Gamma-methacryloxypropyl trimethoxysilane, Beta-(3, 4-epoxycyclohexyl) ethyltrimethoxy silane, Gamma-mercaptopropyltrimethoxy silane, and vinyl-tris (2-methoxyethoxy) silane, together with a multifunctional polydimethyl siloxane emulsified polymer, a nonyl or octyl phenol derivative surfactant, a synthetic ethoxylated amine surfactant, a fluorinated alkyl ester non-ionic surfactant, about 2 to 8% by weight of a lower alkyl alcohol, 0.1 to 12.5% by weight silanol terminated polydimethyl siloxane having a molecular weight between 400 and 310,000, an acid to lower the pH to 4.5 to 5.5 and the remainder water.

12. The method according to claim 11 wherein methyl triethoxy silane is the silane in the composition, together with acetic acid to lower the pH and ethanol as the lower alkyl alcohol.

* * * * *